(12) United States Patent
Ueyama et al.

(10) Patent No.: US 6,653,756 B2
(45) Date of Patent: Nov. 25, 2003

(54) MAGNETIC BEARING DEVICE

(75) Inventors: Hirochika Ueyama, Hirakata (JP); Hironori Kameno, Shiki-gun (JP); Manabu Taniguchi, Kashihara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/759,154

(22) Filed: Jan. 16, 2001

(65) Prior Publication Data

US 2002/0047400 A1 Apr. 25, 2002

(30) Foreign Application Priority Data

Jan. 14, 2000 (JP) ........................................ 2000-005338

(51) Int. Cl.[7] ................................................. H02K 7/09
(52) U.S. Cl. ..................................................... 310/90.5
(58) Field of Search ........................................ 310/90.5

(56) References Cited

U.S. PATENT DOCUMENTS

| | | | | |
|---|---|---|---|---|
| 5,027,280 A | * | 6/1991 | Ando et al. ................ | 310/90.5 |
| 5,093,754 A | * | 3/1992 | Kawashima ................ | 307/104 |
| 5,133,158 A | * | 7/1992 | Kihara et al. ............ | 125/11.02 |
| 6,215,218 B1 | * | 4/2001 | Ueyama .................... | 310/90.5 |

* cited by examiner

*Primary Examiner*—Dang Le
(74) *Attorney, Agent, or Firm*—Jacobson Holman PLLC (57) ABSTRACT

A magnetic bearing device includes a pair of electromagnets holding a rotary body at opposite sides thereof in the direction of each of control axes, a detector for detecting the position of the rotary body, and an electromagnet controller having an integral operation unit for controlling the electromagnets based on the result of detection of the position. The electromagnet controller sets as a target levitated position of the rotary body the position of the rotary body corresponding to the median of an integral output of the integral operation unit when the rotary body is magnetically levitated in the vicinity of one of limit positions in the direction of the control axis determined by protective bearings and an integral output of the unit when the rotary body is magnetically levitated in the vicinity of the other limit position.

2 Claims, 6 Drawing Sheets

MAGNETIC BEARING DEVICE

BACKGROUND OF THE INVENTION

The present invention relates to magnetic bearing devices, and more particularly to a magnetic bearing device for magnetically levitating a rotary body by contactlessly supporting the body with a plurality of magnetic bearings with respect to an axial direction and two radial directions orthogonal to each other and to the axial direction.

Already known as such magnetic bearing devices are those having five control axes, i.e., a control axis in an axial direction and two control axes respectively in two radial directions at each of two locations in the axial direction.

Magnetic bearing devices of the five-axis control type comprise an axial magnetic bearing for contactlessly supporting a rotary body with respect to the direction of axial control axis, two radial magnetic bearings for contactlessly supporting the rotary body with respect to the two directions of radial control axes orthogonal to each other at each of the two locations in the axial direction, and protective bearings (touchdown bearings) serving as mechanical restraining means for mechanically determining the movable ranges of the rotary body in the axial direction and the radial directions. The axial magnetic bearing comprises a pair of electromagnets so arranged as to hold the rotary body at opposite sides thereof in the direction of axial control axis for magnetically attracting the body. Each of the radial magnetic bearings comprises a pair of electromagnets so arranged as to hold the rotary body at opposite sides thereof in the direction of radial control axis concerned for magnetically attracting the body. Furthermore, the magnetic bearing device comprises a position detector serving as position detecting means for detecting the position of the rotary body with respect to the direction of each of the five control axes, and an electromagnet controller serving as electromagnet control means for controlling the pair of electromagnets for the control axis based on the result of detection of the position by the position detector. The position detector in the direction of axial control axis comprises one axial position sensor opposed to the end face of the rotary body to be detected from the direction of axial control axis. The position detector in the direction of each radial control axis comprises a pair of radial position sensors opposed to the rotary body and so arranged as to hold the body at opposite sides thereof in the direction of the control axis. The electromagnet controller comprises a proportional operation unit, differential operating unit and integral operating unit.

With respect to the direction of each control axis, the magnetic bearing device described has a mechanical central position for the movable range determined by the protective bearings, a magnetic central position relative to the positions of the electromagnets of the magnetic bearing, and central position relative to the sensors, i.e., relative to the positions of the position sensors. The mechanical central position in the direction of each control axis is the position of center of the movable range determined by the protective bearings. The magnetic central position with respect to the direction of each control axis is the position of the center of the pair of electrode magnets as arranged in the direction of the control axis. The central position relative to the sensor in the direction of the axial control axis is such that the gap (clearance) between the position detecting end face of the rotary body and the axial position sensor has a predetermined value. The central position relative to the sensors in the direction of each radial control axis is the position of center of the pair of radial position sensors as arranged in the direction of the control axis. The magnetic bearing device is so designed that the mechanical central position, the magnetic central position and the central position relative to the sensors are all in coincidence, whereas an error is likely to occur between the centers owing to manufacturing errors or assembling errors.

With the conventional magnetic bearing device, the electromagnets of the magnetic bearings are so controlled that the rotary body will be held at the central position relative to the sensors which is the designed central position, that is, the center of the rotary body will be at the central position relative to the sensors. Accordingly, the rotary body can not be held at the mechanical central position if the central position relative to the sensors is not in coincidence with the mechanical central position. When the difference of the mechanical central position of the rotary body from the central position relative to the sensors is great in this case, the clearance between the rotary body and the protective bearing diminishes locally to result in troubles.

SUMMARY OF THE INVENTION

An object of the present invention is to provide a magnetic bearing device capable of magnetically levitating a rotary body approximately at the mechanical central position of the device easily.

The present invention provides a magnetic bearing device for magnetically levitating a rotary body by contactlessly supporting the body with magnetic attraction of pairs of electromagnets with respect to an axial direction and two radial directions orthogonal to each other and to the axial direction, the rotary body having movable ranges in the three supporting directions determined by mechanical restraining means, the magnetic bearing device being characterized in that the device comprises a pair of electromagnets so arranged as to hold the rotary body at opposite sides thereof in the direction of each of control axes in the respective three supporting directions, means for detecting the position of the rotary body in the direction of the control axis and electromagnet control means having at least an integral operation unit for controlling the electromagnets based on the result of detection of the position by the position detecting means, the electromagnet control means comprising a target levitated position setting means for setting as a target levitated position of the rotary body in the direction of the control axis the position of the rotary body corresponding to the median of an integral output which is the output of the integral operation unit when the rotary body is magnetically levitated in the vicinity of one of limit positions in the direction of the control axis determined by the mechanical restraining means and an integral output of the integral operation unit when the rotary body is magnetically levitated in the vicinity of the other limit position.

The pair of electromagnets to be used for each control axis are usually identical in characteristics. The electromagnet control means supplies to each electromagnet an energizing current comprising the combination of a predetermined steady-state current and a control current which varies depending on the position of the rotary body in the direction of the control axis. The steady-state current values for the pair of electromagnets are equal to each other, and the control currents therefor are equal to each other in absolute value but opposite in sign.

In the case where no force other than the magnetic attraction of the electromagnets acts on the rotary body as in the case of a horizontal control axis, and when the rotary body is contactlessly supported at a position with respect to the direction of the control axis, the magnetic attracting forces of the two electromagnets on the rotary body are equal to each other. Further the magnetic attraction of each electromagnet is in proportion to the square of the magnitude of the energizing current of the electromagnet and in inverse proportion to the size of the gap between the electromagnet and the rotary body. When the rotary body is supported at the magnetic central position, the gaps between the rotary body and the respective electromagnets are equal to each other in size, with the result that the energizing current values of the respective electromagnets are equal to each other. Thus, the control current values for the respective electromagnets are zero. When the rotary body is supported as shifted toward either direction from the magnetic central position, the gaps between the rotary body and the electromagnets are different from each other in size, so that the energizing current values of the electromagnets differ from each other. Accordingly the control current values for the electromagnets differ from each other. The control current value of each electromagnet is proportional to the displacement of the rotary body from the magnetic central position. Further the control current value of one of the electromagnets is in proportion to the output of the integral operation unit of the electromagnet control means, i.e., the integral output. When the position where the rotary body is supported is shifted from one limit position to the other limit position, therefore, the integral output varies linearly. For this reason, the position of the rotary body corresponding to the median of the integral output obtained when the rotary body is magnetically levitated in the vicinity of one limit position and the integral output obtained when the rotary body is magnetically levitated in the vicinity of the other limit position is approximately the mechanical central position, with the result that by taking the position corresponding to the median as a target levitated position, the rotary body can be magnetically levitated approximately at the mechanical central position.

In the case where the rotary body is subjected to gravity in addition to the magnetic attraction of electromagnets as in the case of a vertical control axis, and when the rotary body is contactlessly supported at a position in the direction of the control axis, the upward magnetic attraction afforded by the upper electromagnet is in balance with the combination of the downward magnetic attraction of the lower electromagnet and gravity. With the rotary body supported at the magnetic central position, therefore, the control current for the upper electromagnet has a positive value, and the control current for the lower electromagnet is of a negative value, so that the integral output is not zero. Even in this case, however, the integral output varies linearly if the position where the rotary body is supported is shifted from one limit position to the other limit position. As in the foregoing case, the rotary body can accordingly be magnetically levitated approximately at the mechanical central position by taking as the target levitated position a position corresponding to the median of the integral output obtained when the rotary body is magnetically levitated in the vicinity of one limit position and the integral output obtained when the rotary body is magnetically levitated in the vicinity of the other limit position.

The same is true of the case wherein the control axis is oblique; regardless of the posture of the rotary body as installed, the body can be magnetically levitated approximately at the mechanical central position.

The magnetic bearing device is usually divided into a machine main body comprising a rotary body, electromagnets of magnetic bearings, protective bearings and position sensors included in position detecting means, and a controller comprising electromagnet control means, a sensor circuit included in the position detecting means for driving the position sensors and calculating the position of the rotary body based on the outputs of the position sensors, etc. The main body and the controller are interconnected by a cable. Further while the magnetic bearing device is in use, there arises a need to replace the controller by another one of the same type. Even if of the same type, machine main bodies are not always identical in the relationship between the mechanical central position, magnetic central position and central position relative to the sensors. However, the machine main bodies remain unchanged in the relationship between these three positions. Accordingly, insofar as the combination of the machine main body and the controller remains unchanged, a target levitated position may be set as described above when the magnetic bearing device is to be initiated into operation for the first time. It is then possible to subsequently magnetically levitate the rotary body approximately at the mechanical central position by using this target levitated position. If the combination of machine main body and controller is changed, however, the target levitated position is not set in the new controller, which therefore fails as it is to magnetically levitate the rotary body at the mechanical central position. Even in such a case, nevertheless, a target levitated position can be set in the manner described above to magnetically levitate the rotary body approximately at the mechanical central position.

When the magnetic bearing device of the present invention is to be initiated into operation for the first time, or when the combination of the machine main body and the controller is changed, the rotary body can be magnetically levitated approximately at the mechanical central position by the simple procedure of moving the rotary body from one of limit positions in the direction of control axis to the other limit position, regardless of the posture of the rotary body as installed. Accordingly it is unlikely that the clearance between the rotary body and mechanical restraining means will diminish locally as experienced in the prior art to result in various troubles.

For example, the target position setting means is adapted to position the rotary body at said one limit position, thereafter magnetically levitate the rotary body in the vicinity thereof, obtain the integral output at this time to store the output as a first limit position integral output in a memory, gradually shift the magnetically levitated position of the rotary body toward said other limit position, determine the position of the rotary body every time the rotary body is so shifted by a small distance at a time and the corresponding integral output for storage as an intermediate position and an intermediate position integral output in the memory, move the rotary body to said other limit position, thereafter magnetically levitate the rotary body in the vicinity thereof, obtain the integral output at this time for use as a second limit position integral output, determine the median of the first limit position integral output and the second limit position integral output, and select the output most proximate to the median from among the intermediate position integral outputs stored in the memory to determine the intermediate position corresponding to the selected intermediate position integral output as the target levitated position.

DETAILED DESCRIPTION OF THE PREFERRED EMBODIMENT

Referromg to the drawings, a description will be given below of a magnetic bearing device of the five-axis control type embodying the present invention.

Figure 1:
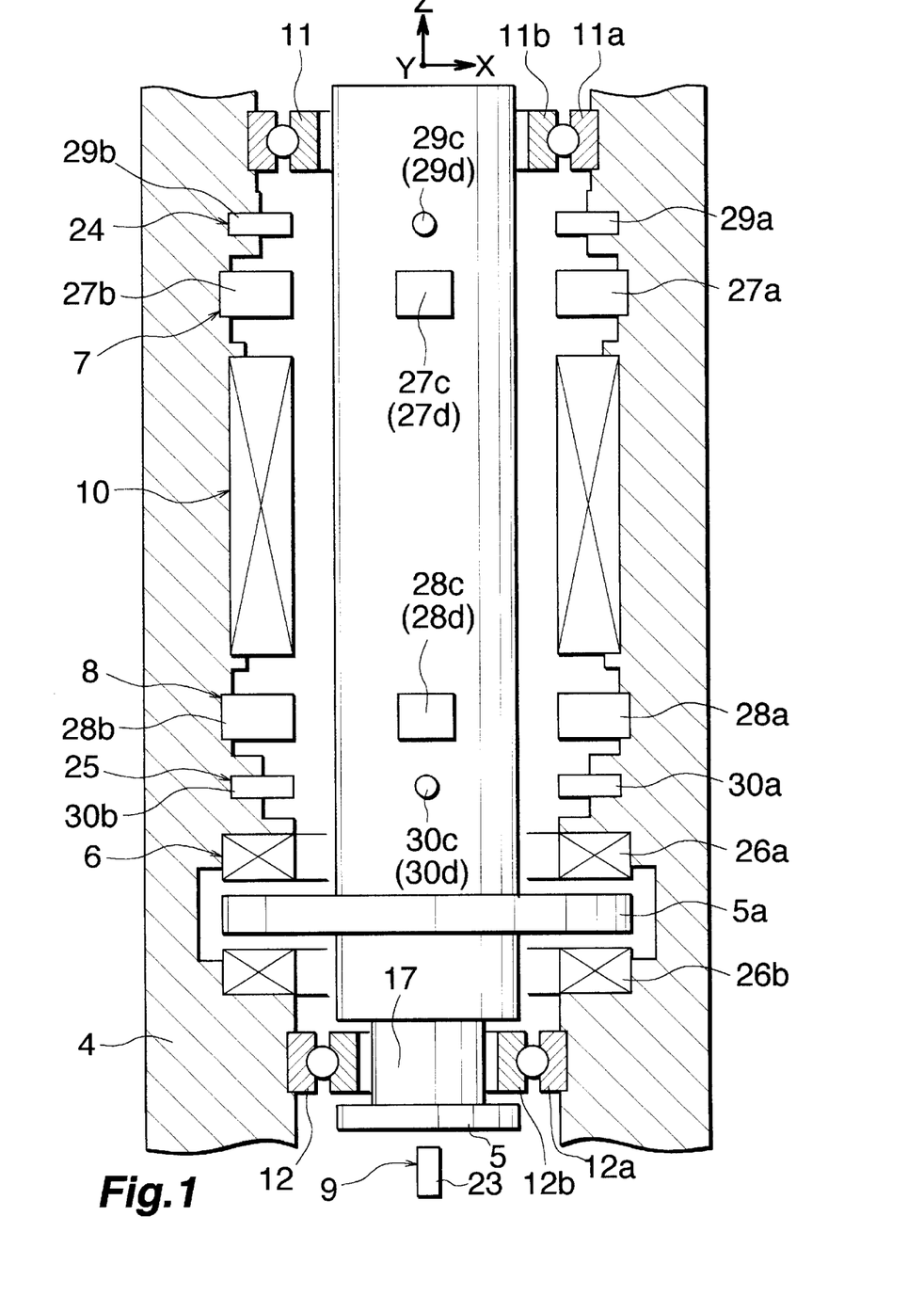
FIG. 1 is a view in vertical section of the main portion of mechanical assembly of a magnetic bearing device embodying the present invention.
Figure 2:
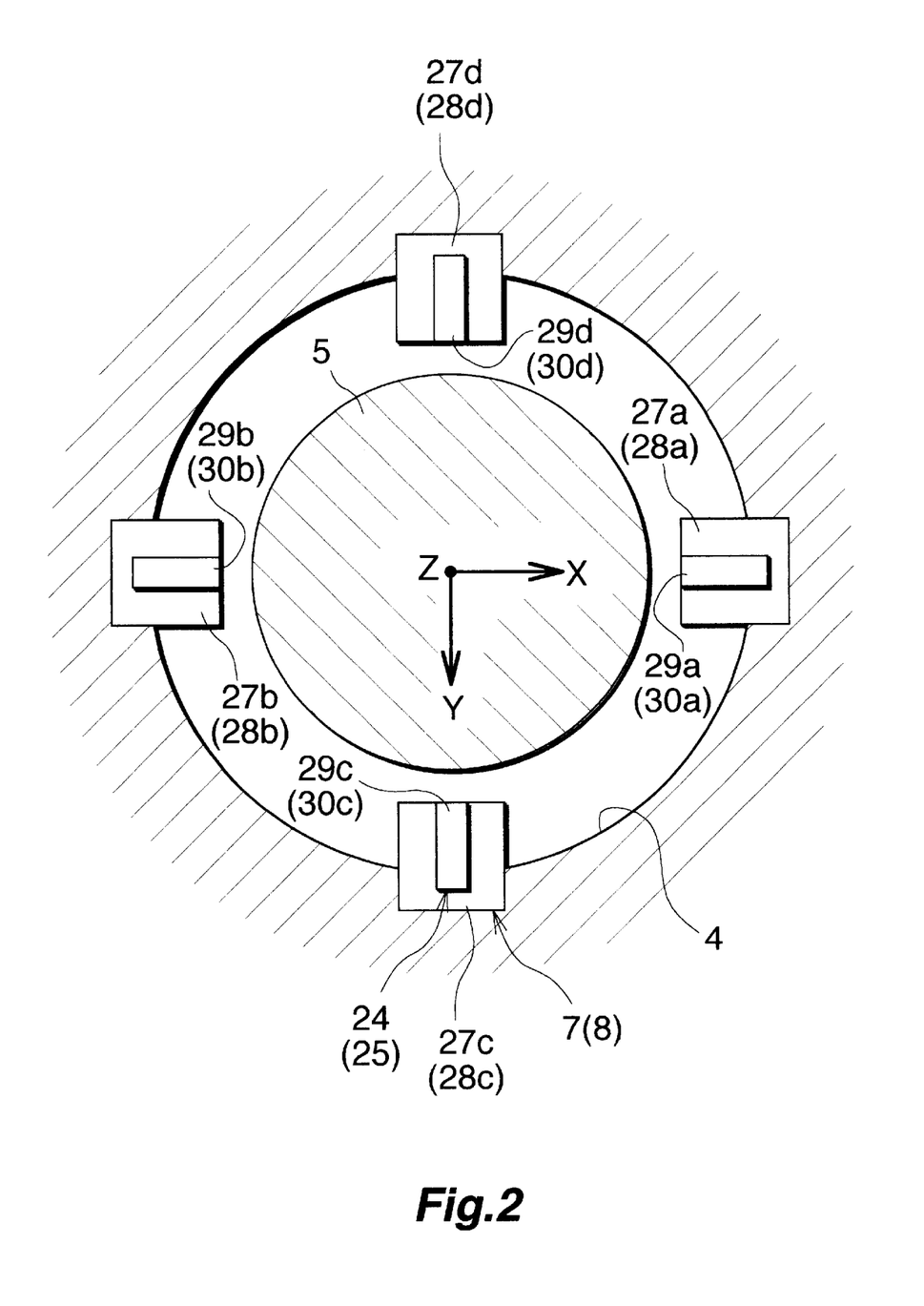
FIG. 2 is a view in cross section of the same.
Figure 3:
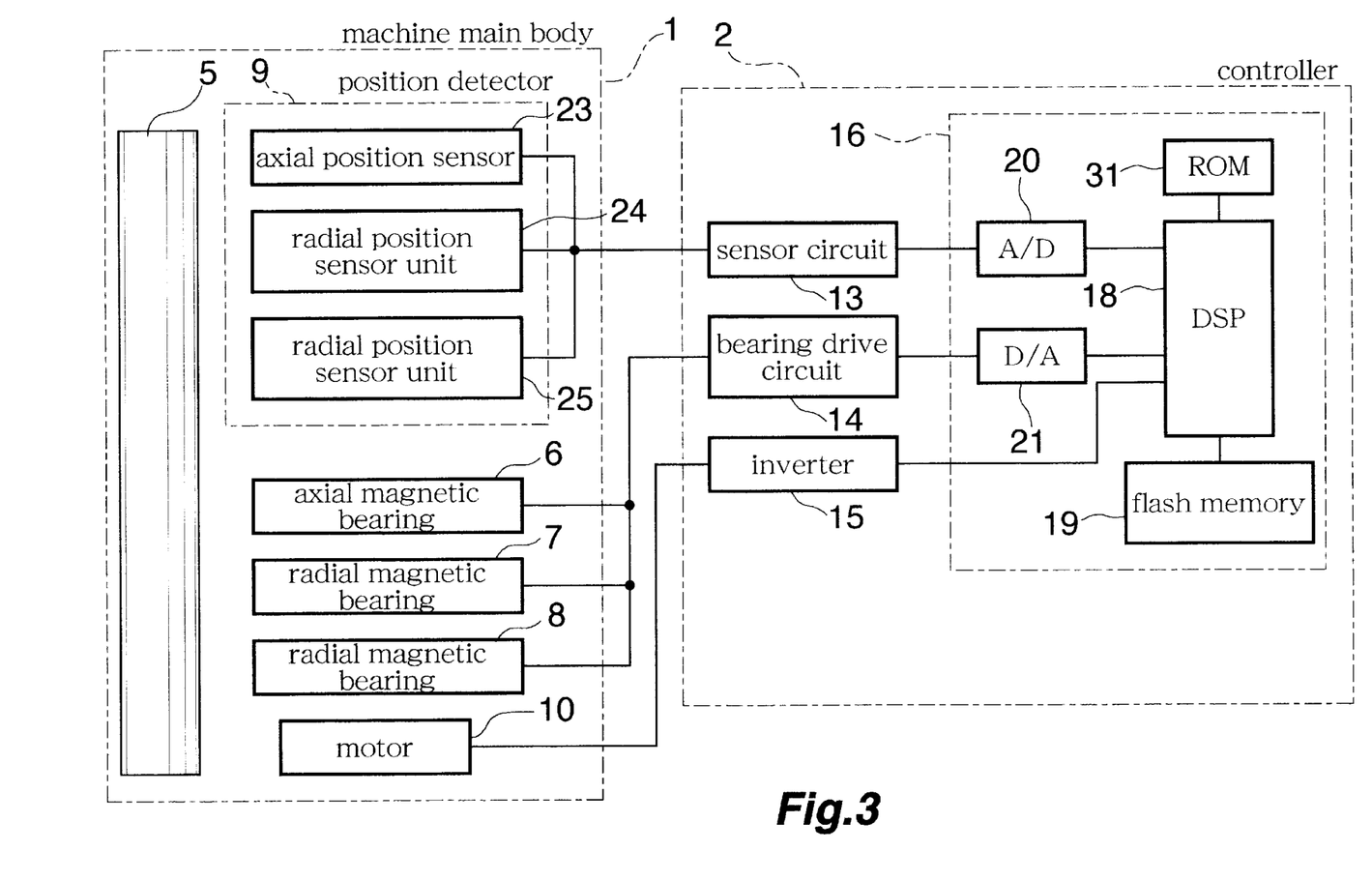
FIG. 3 is a block diagram showing an example of electrical construction of the magnetic bearing device.

FIG. 1 is a view in vertical section of the main porion of mechanical assembly of the magnetic bearing device of the five-axis control type embodying the invention, FIG. 2 is a cross sectional view of the same, and FIG. 3 is a block diagram of an example of electrical construction of the same.

The magnetic bearing device comprises a machine main body 1 and a controller 2 which are interconnected by a cable. The bearing device is of the vertical type wherein a rotary body 5 in the form of a vertical shaft is rotatable within a casing 4 in the form of a vertical hollow cylinder. In the following description, the axis of the rotary body 5 in its axial direction (vertical direction) will be referred to as the Z-axis, and axes in two radial directions (horizontal directions) orthogonal to each other and orthogonal to the Z-axis will be referred to as the X-axis and Y-axis, respectively.

The machine main body 1 has an axial magnetic bearing 6 for supporting the rotary body 5 with respect to the direction of Z-axis without contact therewith (i.e., contactlessly), upper and lower two radial magnetic bearings 7, 8 for contactlessly supporting the rotary body 5 respectively at two locations in the axial direction, with respect to the directions of X-axis and Y-axis, a position detector 9 for detecting the displacement of the rotary body 5 in the axial direction and the position of the rotary body 5 with respect to the X-axis and Y-axis directions at the two locations, a built-in electric motor 10 for rotating the rotary body 5 at a high speed, and upper and lower two protective bearings 11, 12 serving as restraining means for limiting the movable ranges of the rotary body 5 with respect to the axial direction and radial directions and mechanically supporting the rotary body 5 at limit positions of the movable ranges when the magnetic bearings 6, 7, 8 become unable to support the rotary body 5. The Z-axis serves as a control axis in the axial direction. A control axis in the X-axis direction at the location of the upper bearing 7 will be referred to as the "upper X-axis", a control axis in the Y-direction at the same location as the "upper Y-axis," a control axis in the X-axis direction at the location of the lower bearing 8 as the "lower X-axis", and a control axis in the Y-direction at the same location as the "lower Y-axis."

The controller 2 comprises a sensor circuit 13, bearing drive circuit 14, inverter 15 and DSP board 16. The DSP board 16 has a DSP 18 serving as digital processing means programmable with software, ROM 31, flash memory 19 serving as memory means, AD converter 20 and DA converter 21. DSP stands for a digital signal processor, which is specific hardware adapted to receive digital signals and produce digital signals and programmable with software and operable for high-speed real-time processing.

The position detector 9 comprises one axial position sensor 23 for detecting the position of the rotary body 5 with respect to the Z-axis direction, and upper and lower two radial position sensor units 24, 25 for detecting the position of the rotary body 5 with respect to the X-axis and Y-axis directions.

The axial magnetic bearing 6 comprises a pair of axial electromagnets 26a, 26b so arranged as to hold a flange 5a of the rotary body 5 at opposite sides of the flange in the Z-axis direction for magnetically attracting the body 5, the flange 5a being formed on a lower portion of the rotary body 5 integrally therewith. The axial electromagnets are collectively designated by the reference numeral 26. The pair of axial electromagnets 26 are identical in characteristics.

The axial position sensor 23 is disposed as opposed to the lower end face of the rotary body 5 from therebelow with respect to the Z-axis direction and produces a distance signal in proportion to the size of the gap between the lower end face of the body 5 and the sensor 23.

The two radial magnetic bearings 7, 8 are arranged above the axial magnetic bearing 6 and vertically spaced apart from each other, with the motor 10 interposed therebetween. The upper radial magnetic bearing 7 comprises a pair of upper radial electromagnets 27a, 27b so arranged as to hold the rotary body 5 at opposite sides thereof in the X-axis direction for magnetically attracting the body 5, and a pair of upper radial electromagnets 27c, 27d so arranged as to hold the rotary body 5 at opposite sides thereof in the Y-axis direction for magnetically attracting the body 5. These radial electromagnets are designated collectively by the reference numeral 27. Similarly, the lower radial magnetic bearing 8 comprises two pairs of lower radial electromagnets 28a, 28b, 28c, 28d. These radial electromagnets are designated collectively also by the reference numeral 28. At least one pair of electromagnets on the same control axis used in each of the radial bearings 7, 8 are identical in characteristics. Preferably, all the radial electromagnets 27, 28 used are identical in characteristics.

The upper radial position sensor unit 24 is disposed in the vicinity of the upper radial magnetic bearing 7 and comprises a pair of upper radial position sensors 29a, 29b so arranged as to hold the rotary body 5 at opposite sides thereof in the X-axis direction in the vicinity of the electromagnets 27a, 27b in the X-axis direction, and a pair of upper radial position sensors 29c, 29d so arranged as to hold the rotary body 5 at opposite sides thereof in the Y-axis direction in the vicinity of the electromagnets 27c, 27d in the Y-axis direction. These radial position sensors are designated collectively by the reference numeral 29. Similarly, the lower radial position sensor unit 25 is disposed in the vicinity of the lower radial magnetic bearing 8 and comprises two pairs of lower radial position sensors 30a, 30b, 30c, 30d. These radial position sensors are designated collectively also by the reference numeral 30. The radial position sensors 29, 30 each produce a distance signal in proportion to the size of the gap between the outer periphery of the rotary body 5 and the sensor.

The electromagnets 26, 27, 28 and the position sensors 23, 29, 30 are fixed to the casing 4.

The upper protective bearing 11 comprises an antifriction bearing such as a deep groove ball bearing and is adapted to support a radial load. The bearing 11 has an outer ring 11a secured to the casing 4 and an inner ring 11b disposed as opposed to the outer peripheral surface of the rotary body 5 with a suitable gap provided therebetween. The lower protective bearing 12 comprises an antifriction bearing such as a deep groove ball bearing and is adapted to support both an axial load and a radial load. The bearing 12 has an outer ring 12a secured to the casing 4 and an inner ring 12b provided around an annular grooved portion 17 formed in the outer peripheral surface of the rotary body 5, with a suitable gap provided between the ring 12b and the body 5 axially and radially thereof. The axial movable range of the rotary body 5 is determined by the size of the axial gap between the inner ring 12b of the lower bearing 12 and the rotary body 5, and the radial movable range of the rotary body 5 is determined by the size of the radial gap between the rotary body 5 and each of the inner rings 11b, 12b of the bearings 11, 12. Even when the rotary body 2 is supported by the protective bearings 11, 12 at a limit position of the movable range, the rotary body 5 is spaced apart from the electromagnets 26, 27, 28 and from the position sensors 23, 29, 30 and is held out of contact with the electromagnets 26, 27, 28 and the position sensors 23, 29, 30.

The sensor circuit 13 of the controller 2 drives the position sensors 23, 29, 30 of the position detector 9 and calculates the position of the rotary body 5 with respect to the Z-axis direction and with respect to the X-axis direction and the Y-axis direction at the locations of the upper and lower radial position sensor units 24, 25 based on distance signals output from the respective position sensors 23, 24, 25, and delivers the results of calculation, i.e., position signals, to the DSP 18 via the AD converter 20. The position detector 9 and the sensor circuit 13 constitute a position detecting assembly as position detecting means for detecting the position of the rotary body 5 with respect to the direction of each control axis.

The ROM 31 has stored therein, for example, processing programs for the DSP 18. Stored in the flash memory 19 are a control parameter table having held therein control parameters for the magnetic bearings, bias current value table having held therein the bias current value to be described later, etc. Based on the digital position signals representing the position of the rotary body 5 with respect to the respective control axes and delivered from the AD converter 20, the DSP 18 feeds energizing current signals for the electromagnets 26, 27, 28 of the magnetic bearings 6, 7, 8 to the bearing drive circuit 14 via the DA converter 21. The drive circuit 14 supplies energizing currents based on the current signals from the DSP 18 to the electromagnets 26, 27, 28 of the magnetic bearings 6, 7, 8, whereby the rotary body 5 is contactlessly supported at the target levitated position to be described later. The DSP 18 constitutes an electromagnet controller serves as electromagnet control means for controlling the energizing currents to be supplied to the respective electromagnets 26, 27, 28 of the bearings 6, 7, 8 based on the results of detection of the position by the position detecting means.

The DSP 18 further outputs a rotational speed command signal for the motor 10 to the inverter 15, which in turn controls the speed of rotation of the motor 10 based on this signal. As a result, the rotary body 5 as contactlessly supported at the target levitated position by the magnetic bearings 6, 7, 8 is rotated at a high speed.

Figure 4:
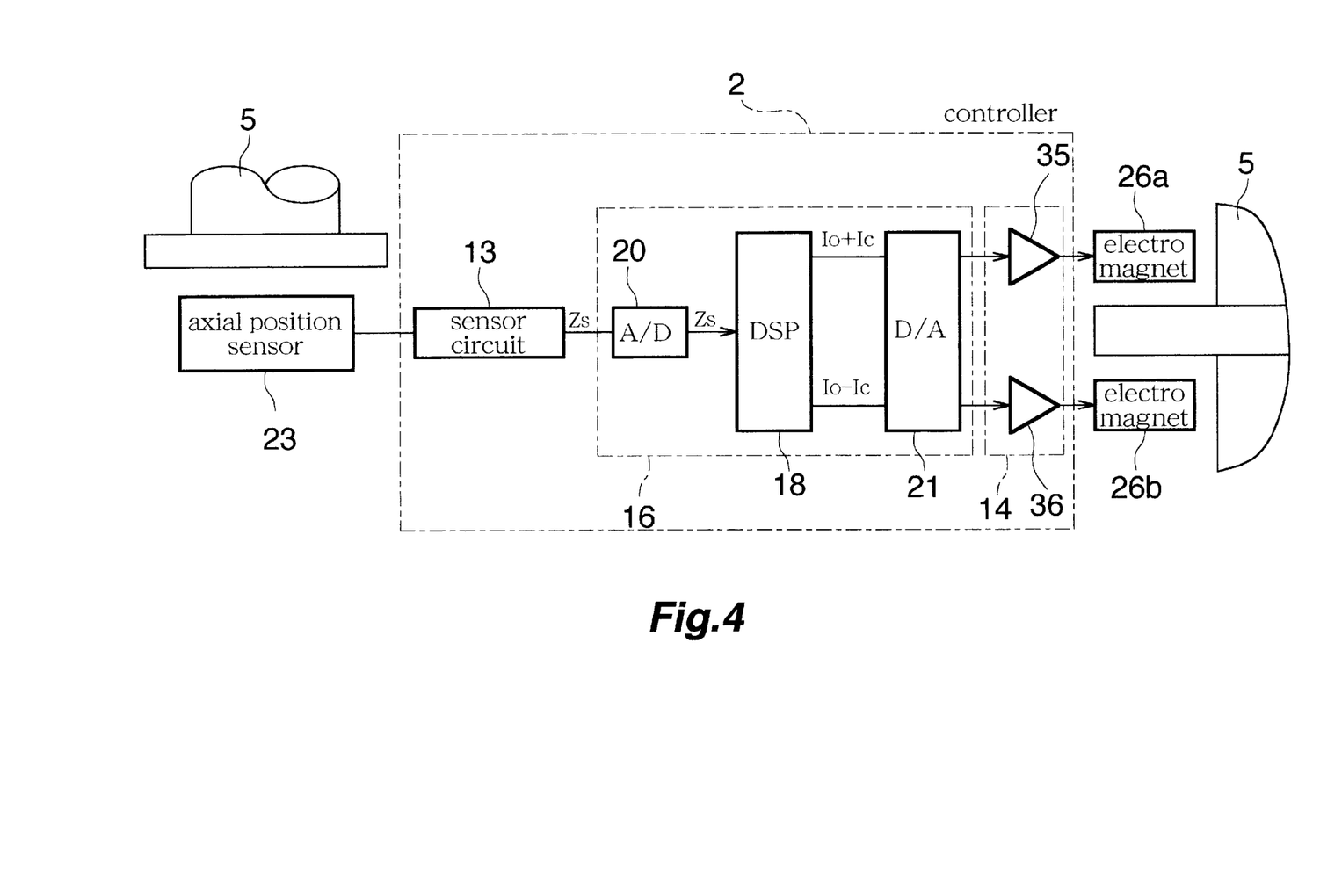
FIG. 4 is a block diagram of the portion of controller of FIG. 3 relating to a pair of axial electromagnets.

FIG. 4 shows only the portion of the controller 2 which is associated with the control of the pair of axial electromagnets 26a, 26b of the axial magnetic bearing 6. With reference to FIG. 4, a description will now be given of the control of the pair of axial electromagnets 26a, 26b by the controller 2.

First, the sensor circuit 13 detects the position of the rotary body 5 with respect to the Z-axis direction from the output signal of the axial position sensor 23 and produces a position signal Zs in proportion to this position. The position signal Zs from the sensor circuit 13 is converted by the AD converter 20 to a digital value, which is fed to the DSP 18. As will be described later, the DSP 18 calculates the displacement of the rotary body 5 from the target levitated position from the digital position signal Zs, and feeds to the DA converter 21 a pair of energizing current signals as control signals corresponding to the respective electromagnets 26. The first of the energizing current signals, (Io+Ic), is converted by the DA converter 21 to an analog signal, which is fed as the first energizing current signal (Io+Ic) to a first power amplifier 35 of the bearing drive circuit 14. The amplifier 35 amplifies this signal (Io+Ic) and feeds an energizing current in proportion to this signal to the first electromagnet 26a. The second of the energizing current signals, (Io−Ic), is converted by the DA converter 21 to an analog signal, which is fed as the second energizing current signal (Io−Ic) to a second power amplifier 36 of the bearing drive circuit 14. The amplifier 36 amplifies this signal (Io−Ic) and feeds an energizing current in proportion to this signal to the second electromagnet 26b. Consequently, the rotary body 5 is supported at the target levitated position with respect to the Z-axis direction.

Figure 5:
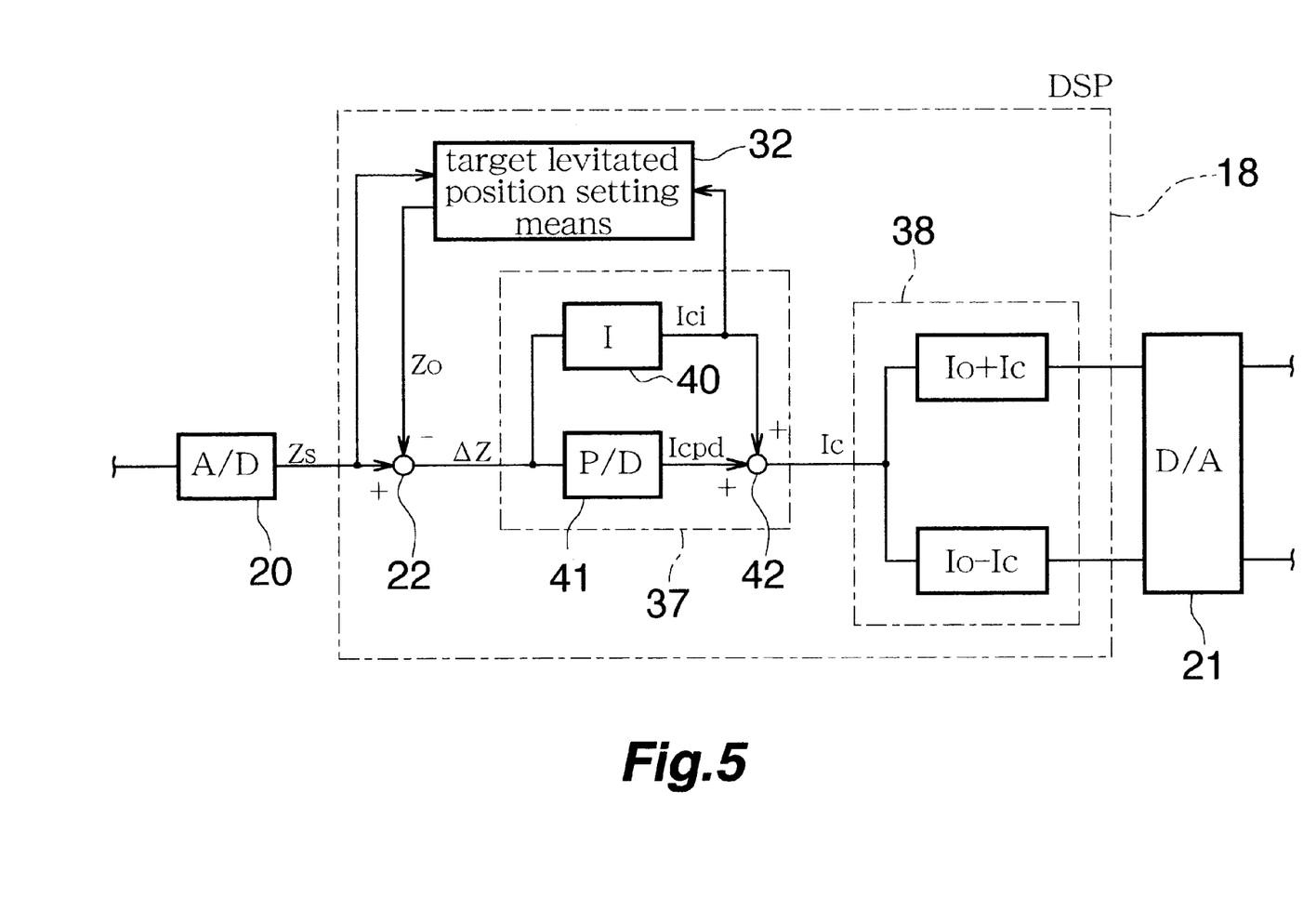
FIG. 5 is a block diagram showing the function of the portion of DSP in FIG. 4.

FIG. 5 shows the operation of the DSP 18 in the form of function blocks in the portion of controller 2 shown in FIG. 4. The DSP 18 functionally comprises subtracting means 22, target levitated position setting means 32, control current computing means 37 and energizing current computing means 38. The subtracting means 22 subtracts the target levitated position Zo input from the target position setting means 32 as will be described later from the position signal Zs input from the AD converter 20 to calculate the value ΔZ of displacement of the rotary body 5 from the target levitated position and feeds the value ΔZ to the control current computing means 37. Based on the displacement value ΔZ from the subtracting means 22, the computing means 37 calculates a control current value Ic for the electromagnets 26a, 26b, for example, by PID operation. The computing means 37 comprises an integral operation unit (integral operation portion) 40, proportional differential operation unit (proportional differential operation portion) 41 and addition unit 42. The integral operation unit 40 calculates an integral component Ici of the control current value Ic based on the displacement value ΔZ using integral operation control parameters stored in the table in the flash memory 19. The proportional differential operation unit 41 calculates a proportional differential component Icpd of the control current value Ic based on the displacement value Δz using proportional operation control parameters and differential operation control parameters stored in the table in the flash memory 19. The addition unit 42 adds the integral component Ici and the proportional differential component Icpd to calculate the control current value Ic and feeds the value to the energizing current computing means 38. Incidentally, the proportional differential operation unit 41 may be divided into a proportional operation unit and a differential operation unit to calculate the control current value Ic by adding up the output of the proportional operation unit, i.e., a proportional component, the output of the differential operation unit, i.e., a differential component, and the output of the integral operation unit 40, i.e., the integral component Ici. The energizing current computing means 38 adds the control current value Ic from the control current computing means 37 to a bias current value Io stored in the table in the flash memory 19 and feeds the resulting value (Io+Ic) to the DA converter 21 as a first energizing current value. The computing means 38 also subtracts the control current value Ic from the bias current value Io and feeds the resulting value (Io–Ic) to the DA converter 21 as a second energizing current value. The target levitated position setting mans 32 sets the target levitated position to be described later.

Figure 6:
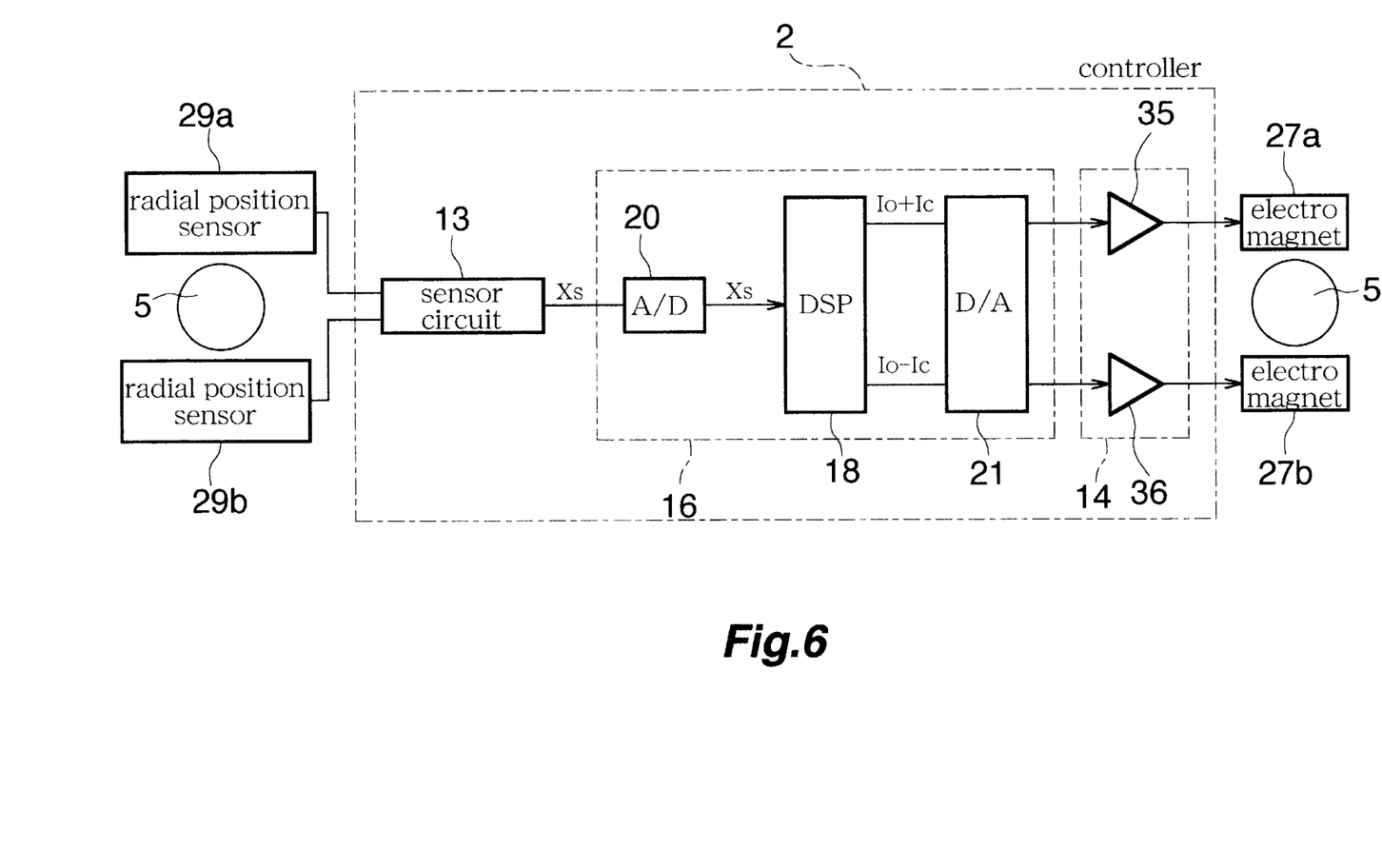
FIG. 6 is a block diagram of the portion of controller of FIG. 3 relating to a pair of radial electromagnets.

FIG. 6 shows only the portion of the controller 2 associated with the control of the pair of radial electromagnets 27a, 27b in the X-axis direction of the upper radial magnetic bearing 7. In this case, the sensor circuit 13 subtracts the output signal of one of the pair of radial position sensors 29a, 29b in the X-axis direction of the upper radial position sensor unit 24 from the other to detect the position of the rotary body 5 with respect to the X-axis direction at the location of the upper radial magnetic bearing 7 and outputs a position signal Xs in proportion to this position. The position signal Xs from the sensor circuit 13 is converted by the AD converter 20 to a digital value (digital displacement signal Xs), which is fed to the DSP 18. The same procedure as in the case of FIG. 4 then follows. Like parts are designated by like reference numerals or symbols.

The same procedure is followed by the controller portion associated with the control of the pair of radial electromagnets 27c, 27d in the Y-axis direction of the upper radial magnetic bearing 7, the portion associated with the control of the pair of radial electromagnets 28a, 28b in the X-axis direction of the lower radial magnetic bearing 8, and the portion associated with the control of the pair of radial electromagnets 28c, 28d in the Y-axis direction of the lower radial magnetic bearing 8.

The magnetic bearing device has a mechanical central position, magnetic central position and a central position relative to the sensors. The mechanical central position is the position of the center in the movable ranges determined by the protective bearings 11, 12. With respect to the axial direction, this position is such that the inner ring 12b of the lower protective bearing 12 is positioned axially in the middle of the groove 17 in the rotary body 5, with opposite end faces of the inner ring 12b axially separated by equal distances from the side faces of the body 5 defining the groove 17 and opposed to the respective end faces. With respect to the radial direction, the center of the rotary body 5 is in coincidence with the centers of the two protective bearings 11, 12 in this position, with the inner rings 11b, 12b of the bearings 11, 12 radially separated from the rotary body 5 by equal distances over the entire circumference. The magnetic central position is the position of the centers of the respective pairs of opposed electromagnets 26, 27, 28 of the magnetic bearings 6, 7, 8. The central position relative to the sensors is such that with respect to the axial direction, the axial position sensor 23 is axially separated from the lower end face of the rotary body 5 by a predetermined distance. With respect to the radial direction, this position is the position of the centers of respective pairs of opposed position sensors 29, 30 of the radial position sensor units 24, 25.

When the magnetic bearing device described is to be initiated into operation first, a target levitated position is set by the DSP 18 for each control axis, and the magnetic bearings 6, 7, 8 are thereafter controlled so that the rotary body 5 will be supported at the target levitated position.

Before the operation of the bearing device is started first, the magnetic bearings 6, 7, 8 and the motor 10 are unenergized, with the rotary body 5 held at a halt as supported by the inner rings 11b, 12b of the protective bearings 11, 12.

When the magnetic bearing device described is to be initiated into operation first, the target levitated position is set, for example, in the order to be described below, i.e., first in the Z-axis direction, then in the X-axis direction and thereafter in the Y-axis direction.

First, the target levitated position is set with respect to the Z-axis direction in the following manner.

First, the rotary body 5 is supported at a predetermined temporary levitated position with respect to the X-axis direction and the Y-axis direction. This is done by the target levitated position setting means of each of the control axes, i.e., the X-axis and Y-axis, feeding the temporary levitated position to the subtracting means. The temporary levitated position with respect to the X-axis direction and the Y-axis direction is, for example, the central position relative to the sensors in the direction of each of these control axes.

When the rotary body 5 is supported at the temporary levitated position with respect to the X-axis and Y-axis directions, the axial electromagnets are unenergized, so that the body 5 is in a lower limit position as supported by the inner ring 12b of the protective bearing 12. In this state, the position signal Zs with respect to the Z-axis direction is read by the target levitated position setting means 32 of the Z-axis, which feeds a position slightly above the signal position to the subtracting means 22 as an initial temporary levitated position, whereby the rotary body 5 is levitated at the initial temporary levitated position in the Z-axis direction. The output (integral output) of the integral operation unit 40 is read at this time and stored in the flash memory 19 as a first limit position integral output.

Next, the temporary levitated position in the Z-axis direction is upwardly shifted by a predetermined distance at a time, and the shifted position is output to the subtracting means 22. In this way, the temporary levitated position of the rotary body 5 is gradually shifted upward. Every time the position is shifted, the position signal Zs and the integral output are read and stored in the flash memory 19 as a corresponding intermediate position and intermediate position integral output.

When the temporary levitated position of the rotary body 5 has been shifted to an upper limit position, the position signal Zs and the integral output no longer alter. This is detected, whereupon the position slightly below the upper limit position is fed to the subtracting means 22 as the final temporary levitated position, whereby the rotary body 5 is levitated at the final temporary levitated position with respect to the Z-axis direction. The corresponding integral output is read at this time and stored in the flash memory 19 as a second limit position integral output.

Next, the median of the first limit position integral output and the second limit position integral output is calculated, the integral output most proximate to this median is selected from among the intermediate position integral outputs stored in the flash memory 19, and the stored value of intermediate position corresponding to the selected intermediate position integral output is set as a target levitated position, whereby the target levitated position in the Z-axis direction is completely set. The target levitated position thus set is thereafter delivered from the target levitated position setting means 32 to the subtracting means 22.

When the rotary body 5 is levitated at a position with respect to the Z-axis direction, the upward magnetic attraction afforded by the upper axial electromagnet 26a is in balance with the combination of the downward magnetic attraction by the lower axial electromagnet 26b and gravity, In other words, the magnetic attraction by the upper electromagnet 26a is always greater than that by the lower electromagnet 26b by an amount corresponding to gravity. The magnetic attraction of each electromagnet 26 is in proportion to the square of the magnitude of energizing current of the electromagnet 26 and in inverse proportion to the size of the gap between the electromagnet 26 and the rotary body 5. For this reason, there is a position where the energizing currents of the upper and lower electromagnets 26 are equal to each other, i.e., a position there the control current is zero, above the magnetic central position in the Z-axis direction. If the levitated position of the rotary body 5 shifts upward or downward from this position of zero control current, the control current value varies in proportion to the displacement of the rotary body 5 from the position of zero control current. Further the value of control current for one of the electromagnets 26 is in proportion to the output of the integral operation unit 40, i.e., the integral output. Accordingly, when the levitated position of the rotary body 5 is shifted from one limit position, i.e., from the lower limit position, to the other limit position, i.e., to the upper limit position, the integral output alters linearly. For this reason, the position corresponding to the median of the integral output obtained when the rotary body 5 is magnetically levitated in the vicinity of one limit position and the integral output obtained when the body is magnetically levitated in the vicinity of the other limit position is approximately the mechanical central position, with the result that by taking the position corresponding to the median as a target levitated position, the rotary body 5 can be magnetically levitated approximately at the mechanical central position.

When the target levitated position with respect to the Z-axis direction has been completely set, target levitated positions with respect to the directions of upper and lower X-axes are set at the same time by the following procedure.

With the rotary body 5 supported at a temporary levitated position in the Y-axis direction and at the target levitated position in the X-axis direction, the rotary body 5 is attracted first to a first limit position in one of the upper and lower X-axis directions by one of the radial electromagnets 27, 28 in the X-axis directions of the upper and lower radial magnetic bearings 7, 8. In this state, the position signal Xs in each X-axis direction is read by the target levitated position setting means for each of the upper and lower X-axes, and a position slightly toward the other second limit position from the position of the signal is fed to the subtracting means for each X-axis as an initial temporary levitated position, whereby the rotary body 5 is supported at the initial levitated position in the X-axis direction. The integral output in each X-axis direction is read at this time and stored in the flash memory 19 as a first limit position integral output.

Next, the temporary levitated position in each X-axis direction is shifted by the target levitated position setting means toward a second limit position by a predetermined distance at a time, and the shifted position is fed to the subtracting means for each X-axis. In this way, the temporary levitated position of the rotary body 5 in the direction of each X-axis is gradually shifted toward the second limit position, and the position signal Xs for each X-axis and the corresponding integral output are read every time the levitated position is so shifted by the predetermined distance, and stored in the flash memory 19 as the corresponding intermediate position and intermediate position integral output.

When the temporary levitated position of the rotary body 5 is shifted to the second limit position, the position signal Xs for each X-axis and the integral output no longer alter. This is detected, whereupon a position slightly closer to the first limit position than the second limit position along each X-axis is fed to the subtracting means as the final temporary levitated position, whereby the rotary body is levitated at the final temporary levitated position in the X-axis direction. The integral output along each X-axis is read at this time and stored in the flash memory 19 as a second limit position integral output.

Subsequently, the median of the first limit position integral output and the second limit position integral output is calculated for each X-axis, the integral output most approximate to the median is selected from among the intermediate position integral outputs stored in the flash memory 19, and the value of the intermediate position stored and corresponding to the selected intermediate position integral output is set as a target levitated position. In this way, the target levitated position is completely set with respect the direction of each X-axis, and the target levitated position thus set is thereafter delivered from the target levitated position setting means to the subtracting means.

Since each X-axis is horizontal, no force other than the magnetic attraction of the radial electromagnets 27 (28) acts on the rotary body 5 with respect to the X-axis direction. When the rotary body 5 is levitated at a position in the X-axis direction, the magnetic attraction by the electromagnet 27a (28a) at one side is in balance with the magnetic attraction by the electromagnet 27b (28b) at the other side. Accordingly, when the rotary body 5 is supported at the magnetic central position wherein the electromagnets 27 (28) are spaced apart from the rotary body 5 by equal distances, the energizing current values of the electromagnets 27 (28) are equal to each other, with zero control current. When the levitated position of the rotary body 5 shifts from the magnetic central position toward the X-axis direction, the control current value varies in proportion to the displacement of the rotary body 5 from the magnetic central position. For this reason, the position corresponding to the median of the integral output obtained when the rotary body 5 is magnetically levitated in the vicinity of one limit position and the integral output obtained when the body is magnetically levitated in the vicinity of the other limit position is approximately the mechanical central position as in the foregoing case, with the result that by taking the position corresponding to the median as a target levitated position, the rotary body 5 can be magnetically levitated approximately at the mechanical central position.

When the target levitated positions are completely set with respect to the Z-axis direction and X-axis directions, target levitated positions with respect to the upper and lower Y-axis directions are set at the same time in the same manner as is the case with the X-axis directions. With this, the target levitated position is completely set with respect to every direction of control axis, and the rotary body 5 is set at the target levitated position thus determined with respect to all the control axes and close to the mechanical central position.

The magnetic bearing device is brought out of operation by deenergizing the motor 10 first to stop the rotation of the rotary body 5 and subsequently deenergizing the electromagnets 26, 27, 28 of the magnetic bearings 6, 7, 8. This renders the rotary body no longer supportable by the magnetic bearings 6, 7, 8, with the result that the body 5 is supported by the protective bearings 11, 12.

The operation of the magnetic bearing device can be resumed by energizing the electromagnets 26, 27, 28 of the magnetic bearings 6, 7, 8 first to levitate the rotary body 5 at the target levitated position described and driving the motor 10 to rotate the rotary body 5.

When the combination of machine main body 1 and controller 2 has been changed, the target levitated position is set by the procedures described. The rotary body 5 can thereafter be magnetically levitated approximately at the mechanical central position using the target levitated position.

Not only when the magnetic bearing device is to be operated for the first time or in the event of a change in the combination of machine main body 1 and controller 2, but also when required, the target levitated position can be set anew in the foregoing manner.

In the case where the mechanical central position is not in coincidence with the magnetic central position in the magnetic bearing device described, the rotary body can not be magnetically levitated at the magnetic central position even if the target levitated position is set for the rotary body. If the rotary body is displaced from the magnetic central position, the energizing currents to be supplied to the pair of electromagnets of the magnetic bearing will not be in a linear relationship with the magnetic attraction afforded to result in the likelihood of unstable control. When this gives rise to a problem, there is a need to determine the magnetic central position when the bearing device is to be operated for the first time in order to magnetically levitate the rotary body at the magnetic central position thus determined. A method of determining the magnetic central position is known as disclosed, for example, in JP-A No. 166139/1997. With this disclosed method, the rotary body is temporarily levitated at a predetermined provisional levitated position such as the central position relative to the sensors, and speculation is made about the posture of the rotary body as installed and the magnetic central position from the energizing currents then flowing through the pair of electromagnets of each magnetic bearing. The postures of the installed rotary body include vertical postures wherein the body, i.e., the Z-axis, is vertical, and horizontal postures wherein the Z-axis is horizontal. The vertical postures include an erect posture wherein the positive direction of the Z-axis is up, and an inverted posture wherein the positive direction of the Z-axis is down. The horizontal postures include an X-axis erect posture wherein the X-axis is vertical and the positive direction of the X-axis is up, an X-axis inverted posture wherein the positive direction of the X-axis is down, a Y-axis erect posture wherein the Y-axis is vertical and the positive direction of the Y-axis is up, and a Y-axis inverted posture wherein the positive direction of the Y-axis is down. A suitable posture is selected for installation in conformity, for example, with the use of the bearing device. The controller is used is used for making speculation about the posture of installation and the magnetic central position. For this purpose, the controller has stored in its memory data (speculation data) representing the relationship of the energizing currents through the pair of electromagnets for each control axis with the position of the rotary body with respect to the direction of the control axis to speculate about the magnetic central position from the electromagnet energizing currents based on the data. However, the speculation data differs for different installation postures of the rotary body, so that the controller needs to have stored therein speculation data as to all installation postures, while the controller is unable to determine the magnetic central position in the case where the rotary body is installed in a posture for which no speculation data is stored as in the case where the Z-axis is installed obliquely. Once the magnetic central position is determined, the rotary body can be levitated at the magnetic central position insofar as the combination of machine main body and controller remains unchanged even if the posture of the installed rotary body is changed. However, in an event of a change in the combination of machine main body and controller, the magnetic central position in the machine main body is not set in the new controller, so that the controller as it is fails to magnetically levitate the rotary body at the magnetic central position. Accordingly, there arises a need to determine the magnetic central position anew, whereas if the rotary body is installed in a posture for which no speculation data is stored in this case, it is still impossible to determine the magnetic central position.

With the magnetic bearing device described, however, the rotary body 5 can be magnetically levitated at the magnetic central position by the following procedure regardless of the installation posture thereof.

In this case, memory means such as a memory is provided in the machine main body 1 for storing the shift of the magnetic central position from the mechanical central position. On the other hand, speculation data for at least one installation posture is stored in the flash memory 19 of the controller 19. The machine main body 1 is first installed in the posture according to the stored speculation data. Next, speculation is made about the mechanical central position, and the rotary body 5 is temporarily levitated in this position as a provisional levitated position. This can be done, for example, by the foregoing method of setting the target levitated position. Since the rotary body 5 is thus magnetically levitated approximately at the mechanical central position, the energizing current values of the pair of electromagnets of each of the magnetic bearings 6, 7, 8 are detected, and speculation is made about the magnetic central position on each control axis from the detected current values based on the speculation data. The method disclosed in JP-A No. 166139/1997 can be used for this procedure. When the speculation has been made on the magnetic central position in this way, the value of the magnetic central position in the direction of each control axis is stored in the controller 2, and the value of the difference or shift of the magnetic central position from the mechanical central position on each control axis is stored in the memory of the machine main body 1.

The magnetic bearing device can be thereafter operated by the combination as it is or by a changed combination of machine main body 1 and a controller 2. The posture of the machine main body 1 installed can be changed when so required.

When the combination of machine main body 1 and controller 2 remains unchanged, the rotary body 5 can be magnetically levitated at the magnetic central position using the value of magnetic central position stored as it is in the controller 2 regardless of the posture of the installed machine main body 1. In this case, the controller 2 needs only to have stored therein the speculation data as to at least one installation posture, and it is not always necessary fro the controller to have stored therein the speculation data relating to all the installation postures.

In the event of a change in the combination of machine main body 1 and the controller 2, speculation is first made about the magnetic central position as will be described below, and the rotary body 5 is thereafter magnetically levitated at the magnetic central position using the value of the magnetic central position. First, the machine main body 1 is installed in a posture for use. The mechanical central position is then determined in the same manner as the foregoing method of setting the target levitated position, and the mechanical central position on each control axis is stored in the controller 2. For each control axis, the value of displacement or shift stored in the memory of the machine main body 1 is then added to the mechanical central position thus determined to thereby determine the magnetic central position. The rotary body 5 is thereafter magnetically levitated at this magnetic central position as the target levitated position. In this case, the mechanical central position can be determined by the foregoing method of setting the target levitated position regardless of the posture of the machine main body 1 installed. Furthermore, the magnetic central position can be determined from the mechanical central position by a simple addition calculation. Accordingly, even in the event of a change in the combination of machine body 1 and controller 2, the magnetic central position can be determined easily to magnetically levitate the rotary body 5 at the magnetic central position regardless of the installation posture of the machine main body 1. Further since the new controller 2 need to make speculation about the magnetic central position based on the energizing currents of the electromagnets as described above, there is no need to store the speculation data described.

Although the foregoing embodiment is a magnetic bearing device of the inner rotor type wherein a rotary body rotates inside a casing which is a fixed portion, the present invention is applicable also to magnetic bearing devices of the outer rotor type wherein a rotary body is rotatable externally of a fixed portion.

The foregoing embodiment is a magnetic bearing device of the vertical type wherein the rotary member is disposed vertically, whereas the invention can be embodied also as magnetic bearing devices of the horizontal type which have a horizontal rotary body.

What is claimed is:

1. A magnetic bearing device for magnetically levitating a rotary body by contactlessly supporting the body with magnetic attraction of pairs of electromagnets with respect to an axial direction and two radial directions orthogonal to each other and to the axial direction, the rotary body having movable ranges in the three supporting directions determined by mechanical restraining means, the magnetic bearing device comprising: a pair of electromagnets arranged to hold the rotary body at opposite sides thereof in the direction of each of control axes in the respective three supporting directions, means for detecting the position of the rotary body in the direction of the control axis, protective bearings serving as the mechanical restraining means, and electromagnet control means having at least an integral operation unit for controlling the electromagnets based on the result of detection of the position by the position detecting means, wherein the electromagnet control means is to magnetically levitate the rotary body at a predetermined target levitated position by supplying to each electromagnet an energizing current comprising a combination of a predetermined steady-state current and a control current which varies depending on the position of the rotary body, and the electromagnet control means comprises a target levitated position setting means for setting as the target levitated position of the rotary body in the direction of the control axis the position of the rotary body corresponding to a median of an integral output which is the output of the integral operation unit when the rotary body is magnetically levitated in a vicinity of one of limit positions in the direction of the control axis determined by the mechanical restraining means and the integral output of the integral operation unit when the rotary body is magnetically levitated in a vicinity of the other limit position.

2. A magnetic bearing device according to claim 1, wherein the target position setting means is adapted to position the rotary body at said one limit position, thereafter magnetically levitate the rotary body in the vicinity thereof, obtain the integral output at this time to store the output as a first limit position integral output in a memory, gradually shift the magnetically levitated position of the rotary body toward said other limit position, determine the position of the rotary body every time the rotary body is so shifted by a small distance at a time and a corresponding integral output for storage as an intermediate position and an intermediate position integral output in the memory, move the rotary body to said other limit position, thereafter magnetically levitate the rotary body in the vicinity thereof, obtain the integral output at this time for use as a second limit position integral output, determine a median of the first limit position integral output and the second limit position integral output, and select the output most proximate to a median from among the intermediate position integral outputs stored in the memory to determine the intermediate position corresponding to the selected intermediate position integral output as the target levitated position.

* * * * *